(12) United States Patent
Parvataneni et al.

(10) Patent No.: US 11,825,319 B2
(45) Date of Patent: Nov. 21, 2023

(54) SYSTEMS AND METHODS FOR MONITORING PERFORMANCE IN DISTRIBUTED EDGE COMPUTING NETWORKS

(71) Applicant: Verizon Patent and Licensing Inc., Arlington, VA (US)

(72) Inventors: Raghuram Parvataneni, Edison, NJ (US); Kirk Campbell, Long Valley, NJ (US); Anil K. Guntupalli, Irving, TX (US); Ravi Sharma, Freehold, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 418 days.

(21) Appl. No.: 16/686,802

(22) Filed: Nov. 18, 2019

(65) Prior Publication Data

US 2021/0153041 A1 May 20, 2021

(51) Int. Cl.
*H04W 24/06* (2009.01)
*H04L 41/0803* (2022.01)
*H04L 43/16* (2022.01)
*H04L 43/065* (2022.01)
*H04L 43/045* (2022.01)
*H04L 43/50* (2022.01)

(52) U.S. Cl.
CPC ......... *H04W 24/06* (2013.01); *H04L 41/0803* (2013.01); *H04L 43/045* (2013.01); *H04L 43/065* (2013.01); *H04L 43/16* (2013.01); *H04L 43/50* (2013.01)

(58) Field of Classification Search
CPC ........ H04L 43/50; H04L 43/065; H04L 43/16
See application file for complete search history.

(56) References Cited

U.S. PATENT DOCUMENTS

| | | | |
|---|---|---|---|
| 9,087,161 B1* | 7/2015 | Diamond | G06F 13/4081 |
| 10,461,421 B1* | 10/2019 | Tran | H01Q 21/28 |
| 2013/0219052 A1* | 8/2013 | Prakash | H04L 43/50 709/224 |
| 2014/0098685 A1* | 4/2014 | Shattil | H04L 41/147 370/252 |
| 2018/0324031 A1* | 11/2018 | Kim | H04L 43/0888 |
| 2020/0008044 A1* | 1/2020 | Poornachandran | H04W 16/18 |
| 2020/0097490 A1* | 3/2020 | Pandey | G06F 16/24522 |
| 2020/0204477 A1* | 6/2020 | Rahman | H04L 69/163 |
| 2020/0403876 A1* | 12/2020 | Liu | H04L 41/12 |
| 2021/0064981 A1* | 3/2021 | Turgeman | G06N 3/08 |

* cited by examiner

*Primary Examiner* — Bryan Y Lee

(57) ABSTRACT

A computer device may include a memory storing instructions and processor configured to execute the instructions to provide a test configuration to a plurality of multi-access edge computing (MEC) devices; collect test results associated with the provided test configuration from the plurality of MEC devices; and obtain capability information associated with particular ones of the plurality of MEC devices. The computer device may be further configured to generate a test report that relates one or more parameters included in the test results and the obtained capability information to particular ones of the plurality of MEC devices; and use the generated test report to select a MEC device from the plurality of MEC devices for a user equipment (UE) device requesting an application session.

20 Claims, 8 Drawing Sheets

SYSTEMS AND METHODS FOR MONITORING PERFORMANCE IN DISTRIBUTED EDGE COMPUTING NETWORKS

BACKGROUND INFORMATION

In order to satisfy the needs and demands of users of mobile communication devices, providers of wireless communication services continue to improve and expand available services as well as networks used to deliver such services. One enhancement to broadband wireless networks is the use of Multi-access Edge Computing (MEC) architecture. The MEC architecture includes devices, which have previously been implemented in a core network or cloud center, located at the network edge relative to the point of attachment of a wireless communication device to a wireless access network. Server devices in a MEC network enable high computing loads to be offloaded from the core network to the edge and provide various services and applications to wireless communication devices with reduced latency. However, managing a large number of MEC devices poses various challenges.

DETAILED DESCRIPTION OF PREFERRED EMBODIMENTS

Figure 1:
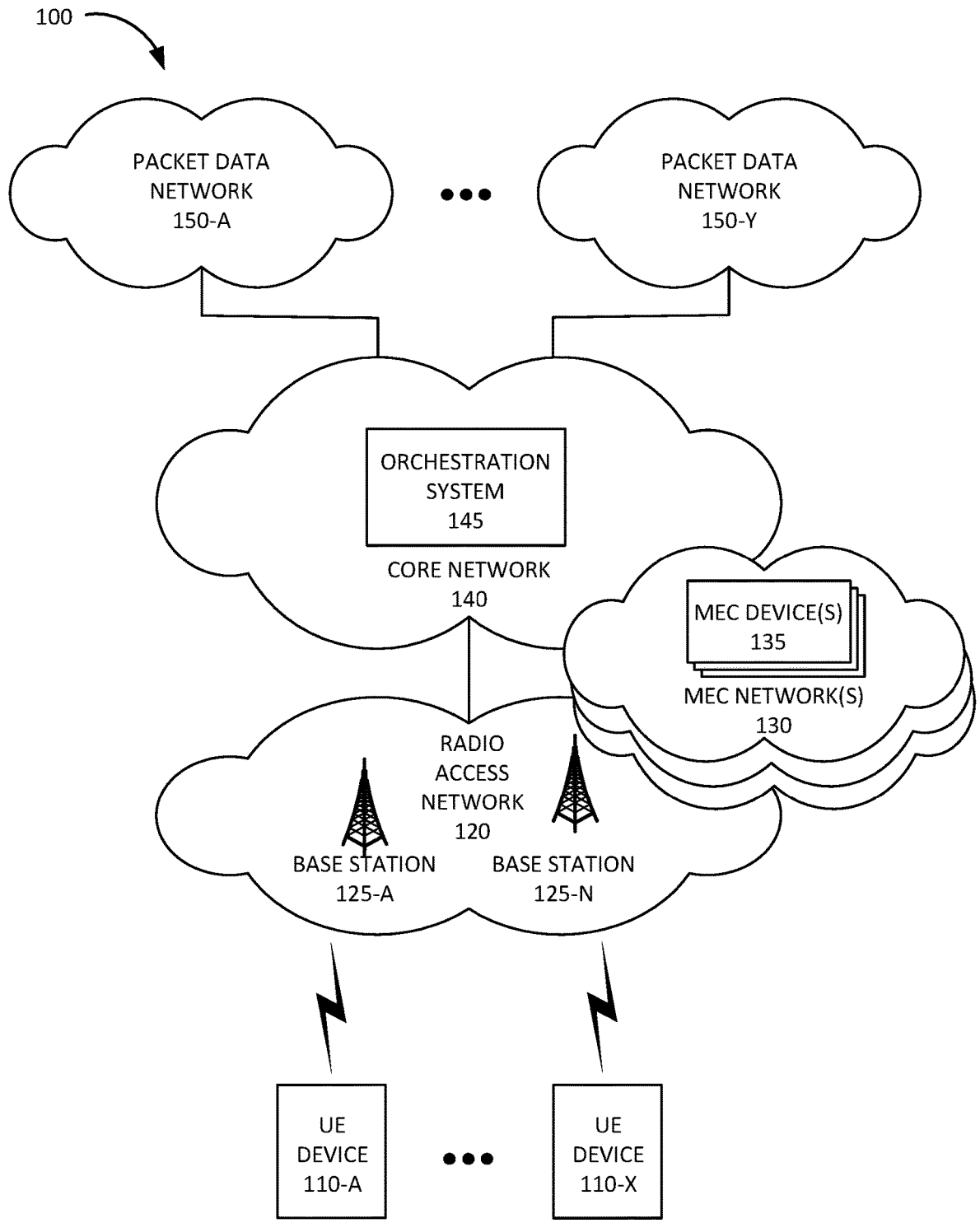
FIG. 1 illustrates an environment according to an implementation described herein.

The following detailed description refers to the accompanying drawings. The same reference numbers in different drawings identify the same or similar elements.

A wireless communication device, referred to herein as a user equipment (UE) device, may connect wirelessly to a network via a base station. The base station includes a radio frequency (RF) transceiver and, together with other base stations, may form a radio access network (RAN). The RAN may interface with a core network that enables establishment of an Internet Protocol (IP) connection to other networks, such as the public Internet or a private IP network. When a UE device requests an application session with a server device located in an IP network, the UE device may need to establish an IP connection to the IP network via the core network. Since the server device may be distant to the UE device from a geographic perspective and/or from a network topological perspective, such a connection may traverse a large number of routing devices and/or gateway devices. Thus, the connection between the server device and the UE device may result in large latency values.

To reduce latency and/or other parameters associated with user quality of experience, and to reduce the load of traffic in core networks and gateway devices and to provide more efficient services, a provider of communication services that manages a RAN may deploy a MEC network that includes one or more MEC devices. The MEC devices in the MEC network may provide application services, and/or other types of services, such as Domain Name System (DNS) lookup, to UE devices wirelessly connected to a particular base station. The MEC network may be located in geographic proximity to a base station and close to the base station from a network topology perspective. For example, the MEC network may be closer to the particular base station than to other base stations and may be reached with fewer network device traversals ("hops") than traffic from other base stations or traffic destined to devices in other packet data networks, such as a cloud computing center located in a core network or private packet data network. When a UE device requests a service that is available via a MEC network, the UE device may be connected to a MEC device in the MEC network, rather than to an application server in the core network or an external packet data network. Different MEC networks may service different sets of base stations. A set of MEC networks distributed in different locations may be referred to as a "distributed edge" or "distributed edge computing."

However, a MEC device in the closest MEC network with respect to a UE device may not always be the best choice for servicing the UE device. As an example, the UE device may be associated with a request that the local MEC network may not be able to service. For another example, the request may require an application, or a hardware component (e.g., an artificial intelligence (AI) accelerator), that is not available in the local MEC network. As another example, the request may be associated with a latency requirement that the local MEC network cannot meet, because of network loads or processing delays. Therefore, a provider of telecommunication services may need to collect information relating to particular MEC devices in MEC networks servicing UE devices with subscriptions managed by the provider.

Implementations described herein relate to performance monitoring in distributed edge computing. An orchestrator system may provide test configurations to MEC devices. Each MEC device may receive the test configuration from the orchestrator system, perform a test based on the received test configuration, and provide test results based on the performed test to the orchestration system. The MEC device may perform the test by instructing a testing device to send data to the MEC device based on the test configuration.

In some implementations, the testing device may correspond to a UE device communicating with a base station associated with the MEC device. The MEC device may configure the testing device as a UE device by, for example, providing authentication information that enables the testing device to attach to the base station. In other implementations, the testing device may communicate with the MEC device from the RAN, the core network, or another MEC device located in the MEC network or another MEC network.

The test configuration may specify a test for a particular parameter using a particular communication protocol from a particular location. As an example, the test may measure a latency value, such as one-way delay (OWD), round-trip delay (RTT), bandwidth-delay product, packet delay variation, and/or another type of latency value. As another example, the test may measure a different type of parameter, such as, for example, bandwidth, data throughput, jitter, error rate, and/or signal quality. The communication protocol may correspond to, for example, Internet Control Message Protocol (ICMP), Transmission Control Protocol (TCP), User Datagram Protocol (UDP), Real-Time Transport Protocol (RTTP), Hypertext Transfer Protocol (HTTP), Transport Layer Security (TLS), Message Queue Telemetry Transport (MQTT), and/or another type of communication protocol.

Furthermore, the orchestrator system may obtain capability information associated with the different MEC devices. The capability information may include, for example, information indicating whether a particular one of the MEC devices includes at least one of a particular type of graphics processing unit (GPU), a particular type of hardware accelerator device, a particular type of virtual device, a particular type of operating system, a particular type of application, and/or other types of capability information. Furthermore, the capability information may include information relating to the capacity of particular hardware elements or devices, such as processor, memory, and/or storage devices, virtual devices, applications, and/or other functionality of a MEC device, information relating to network capacity or bandwidth of a network link associated with the MEC device, and/or other type of capacity information.

The orchestration system may collect test results from the MEC devices and may generate a test report that relates parameters included in the test results and the obtained capability information to particular MEC devices. For example, the test report may relate, for a particular MEC device, particular locations and communication protocols to latency values and/or other parameters, such as bandwidth, throughput, an error rate, and/or a signal quality. The generated test report may then be used to select a MEC device from a set of MEC devices for a UE device requesting a MEC service. For example, the orchestrator system may select a MEC device that satisfies a latency requirement and a capability requirement for the requested MEC service.

Furthermore, the orchestration system may generate a visual representation of the test report and provide the generated visual representation of the test report to an administration device. Moreover, the orchestration system may instruct the MEC device to send an alert when a threshold for a parameter has been approached, reached or exceeded. The MEC device may detect that the threshold has been approached, reached or exceeded and send an alert to the orchestrator system in response. Additionally, or alternatively, the orchestration system may detect that a threshold for a particular parameter has been reached for a MEC device based on the obtained test results and generate an alert in response.

FIG. 1 is a diagram of an exemplary environment 100 in which the systems and/or methods, described herein, may be implemented. As shown in FIG. 1, environment 100 may include UE devices 110-A to 110-X (referred to herein individually as "UE device 110" and collectively as "UE devices 110"), a radio access network 120, MEC networks 130, a core network 140, and packet data networks 150-A to 150-N (referred to herein collectively as "packet data networks 150" and individually as "packet data network 150").

UE device 110 may include any device with wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as machine-type communication (MTC), and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, a vending machine, a parking meter, etc.), and/or another type of electronic device.

Radio access network 120 may enable UE devices 110 to connect to core network 140 for mobile telephone service, Short Message Service (SMS) message service, Multimedia Message Service (MMS) message service, Internet access, cloud computing, and/or other types of data services. Radio access network 120 may include base stations 125-A to 125-N (referred to herein collectively as "base stations 125" and individually as "base station 125"). Each base station 125 may include devices and/or components configured to enable wireless communication with UE devices 110 located in cells or sectors serviced by base station 125. For example, for each cell or sector serviced by the base station, the base station may include a radio frequency (RF) transceiver facing a particular direction. Base station 125 may include a Fourth Generation (4G) base station configured to communicate with UE devices 110 as an eNodeB that uses a 4G Long Term Evolution (LTE) air interface. Additionally, or alternatively, base station 125 may include a Fifth Generation (5G) base station configured to communicate with UE devices 110 as a gNodeB that uses a 5G New Radio (NR) air interface. A gNodeB may include one or more antenna arrays configured to send and receive wireless signals in the mm-wave frequency range.

Furthermore, radio access network 120 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Each MEC network 130 may be associated with one or more base stations 125 and may provide MEC services for UE devices 110 attached to the one or more base stations 125. MEC network 130 may be in proximity to the one or more base stations 125 from a geographic and network topology perspective. As an example, MEC network 130 may be located on a same site as one of the one or more base stations 125. As another example, MEC network 130 may be geographically closer to the one or more base stations 125, and reachable via fewer network hops and/or fewer switches, than other base stations 125 and/or packet data networks 150. As yet another example, MEC network 130 may be reached without having to go through a gateway device, such as a 4G Packet Data Network Gateway (PGW) or a 5G User Plane Function (UPF).

MEC network 130 may interface with RAN 120 and/or with core network 140 via a MEC gateway device (not shown in FIG. 1). In some implementations, MEC network 130 may be connected to RAN 120 via a direct connection to base station 125. For example, in a 4G network, MEC network 130 may connect to an eNodeB via an S1 interface, or, in a 5G network, MEC network 130 may connect to a gNodeB via an N3 interface. In other implementations, MEC network 130 may include, or be included in, core network 140. As an example, in a 4G network, MEC network 130 may connect to a Serving Gateway (SGW) via an S5 interface, or, in a 5G network, MEC network 130 may connect to a Session Management Function (SMF) via an N4 interface. MEC network 130 may support UE device 110 mobility and handover application sessions from a first MEC network 130 to a second MEC network 130 when UE device 110 experiences a handover from a first base station 125 to a second base station 125.

MEC network 130 may include one or more MEC devices 135. MEC network 130 may support device registration, discovery, and/or management of MEC devices 135 in MEC network 130. MEC device 135 may include particular hardware capabilities, such as particular CPUs, GPUs, hardware accelerators, and/or other types of hardware capabilities. Furthermore, MEC device 135 may include particular software capabilities, such as a particular operating system, virtual machine, virtual container, application, and/or another type of software capability.

MEC device 135 may connect to one or more base stations 125 in RAN 120 and provide one or more MEC services to UE devices 110 connected to the one or more base stations 125. As an example, a MEC service may include a service associated with a particular application, such as a content deliver system that provides streaming video on demand, an audio streaming service, a real-time online game, a virtual reality application, a medical or health monitoring application, and/or another type of application with a low latency requirement. As another example, a MEC service may include a cloud computing service, such as cache storage, use of artificial intelligence (AI) accelerators for machine learning computations, use of GPUs for processing of graphic information and/or other types of parallel processing, and/or other types of cloud computing services. As yet another example, a MEC service may include a network service, such as authentication, for example via a certificate authority for a Public Key Infrastructure (PKI) system, a local DNS service, implementation of a virtual network function (VNF), and/or another type of network service. As yet another example, a MEC service may include control of IoT devices, such as hosting an application server for autonomous vehicles, a security system, a manufacturing and/or robotics system, and/or another type of IoT system.

MEC device 135 may control one or more testing devices to test one or more parameters associated with MEC device 135, such as latency, throughput, signal quality, and/or other types of parameters from various locations in the service area of base station 125 associated with MEC device 135. A testing device may include a particular UE device 110 that sends test data to MEC device 135 via base station 125. Additionally, or alternatively, the testing device may include a device included in base station 125 or in core network 140 that communicated with MEC device 135 using a wired connection and/or a short-range wireless connection (e.g., WiFi, Bluetooth, etc.). MEC device 135 may obtain test data sent by the testing device, determine one or more parameter values associated with the test data, and provide the determined one or more parameter values to orchestration system 145 in core network 140.

Core network 140 may manage communication sessions for UE devices 110. For example, core network 140 may establish an IP connection between UE device 110 and a packet data network 150. Furthermore, core network 140 may enable UE device 110 to communicate with an application server, and/or another type of device, located in a packet data network 150 using a communication method that does not require the establishment of an IP connection between UE device 110 and packet data network 150, such as, for example, Data over Non-Access Stratum (DoNAS).

In some implementations, core network 140 may include an LTE core network (e.g., an evolved packet core (EPC) network). In other implementations, core network 140 may include a Code Division Multiple Access (CDMA) core network. For example, the CDMA access network may include a CDMA enhanced High Rate Packet Data (eHRPD) network (which may provide access to an LTE core network). An EPC network may include devices that implement network functions that include a Mobility Management Entity (MME) that implements control plane processing, authentication, mobility management, tracking and paging, and activating and deactivating bearers; an SGW that provides an access point to and from UE devices, acts as a local anchor point during handovers, and directs gateway to a PGW; a PGW that functions as a gateway to a particular packet data network 150; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

In other implementations, core network 140 may include a 5G core network. A 5G core network may include devices that implement network functions that include an Access and Mobility Function (AMF) to perform registration management, connection management, reachability management, mobility management, and/or lawful intercepts; an SMF to perform session management, session modification, session release, IP allocation and management, Dynamic Host Configuration Protocol (DHCP) functions, and selection and control of a UPF; a UPF to serve as a gateway to packet data network 150, act as an anchor point, perform packet inspection, routing, and forwarding, perform QoS handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device 110; and/or other types of network functions.

Furthermore, a 5G core network may implement network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular QoS class, type of service, and/or particular enterprise customer associated with a set of UE devices.

The components of core network 140 may be implemented as dedicated hardware components and/or as virtualized network functions (VNFs) implemented on top of a common shared physical infrastructure using Software Defined Networking (SDN). For example, an SDN controller may implement one or more of the components of core network 140 using an adapter implementing a VNF virtual machine, a Cloud-Native Network Function (CNF) container, an event driven serverless architecture interface, and/or another type of SDN architecture. The common shared physical infrastructure may be implemented using one or more devices 200 described below with reference to FIG. 2 in a cloud computing center associated with core network 140. Additionally, or alternatively, some, or all, of the common shared physical infrastructure may be implemented using one or more devices 200 included in MEC device 135.

Core network 140 may include orchestration system 145. Orchestration system 145 may include one or more computer devices, such as server devices, configured to collect performance information associated with MEC networks 130. Orchestration system 145 may generate a test configuration, send the test configuration to MEC devices 135, and collect test results associated with the test configuration and generate a test report based on the collected test results. The test report may be used to generate a dashboard that includes a visual representation of the collected test results for analysis by an administrator. Furthermore, the test report may be used to select a MEC device for a particular session for a particular UE device 110. Additionally, orchestrator system 145 may generate an alert when a threshold for a parameter for a particular MEC device 135 is reached or exceeded.

Packet data networks 150-A to 150-N may each include a packet data network. A particular packet data network 150 may be associated with an Access Point Name (APN) and UE device 110 may request a connection to the particular packet data network 150 using the APN. Packet data network 150 may include, and/or be connected to and enable communication with, a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
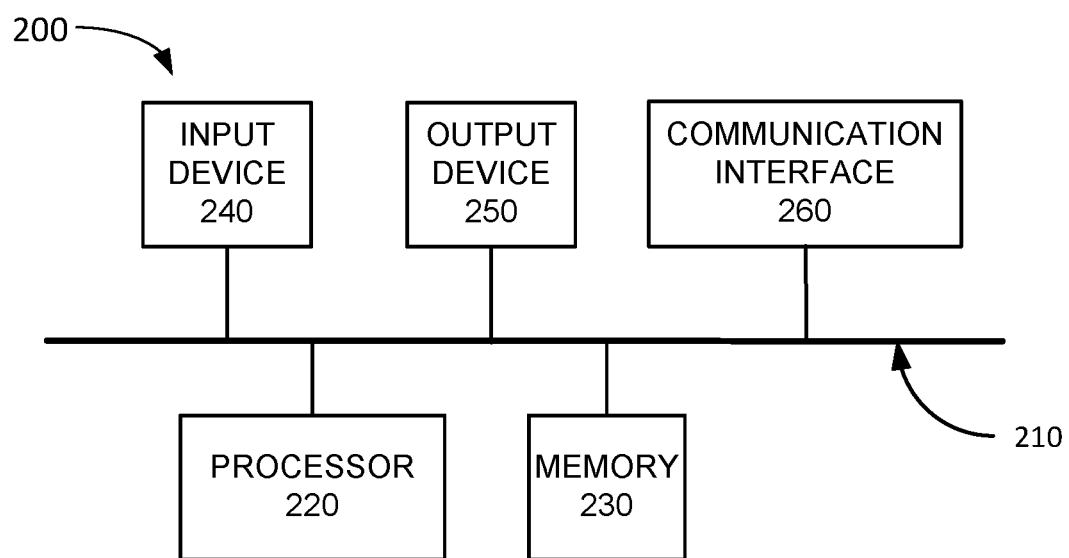
FIG. 2 illustrates exemplary components of a device that may be included in the environment of FIG. 1 according to an implementation described herein.

FIG. 2 is a diagram illustrating example components of a device 200 according to an implementation described herein. UE device 110, base station 125, MEC device 135, and/or orchestration system 145 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240.

In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to RF signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to performance monitoring of MEC devices 135. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
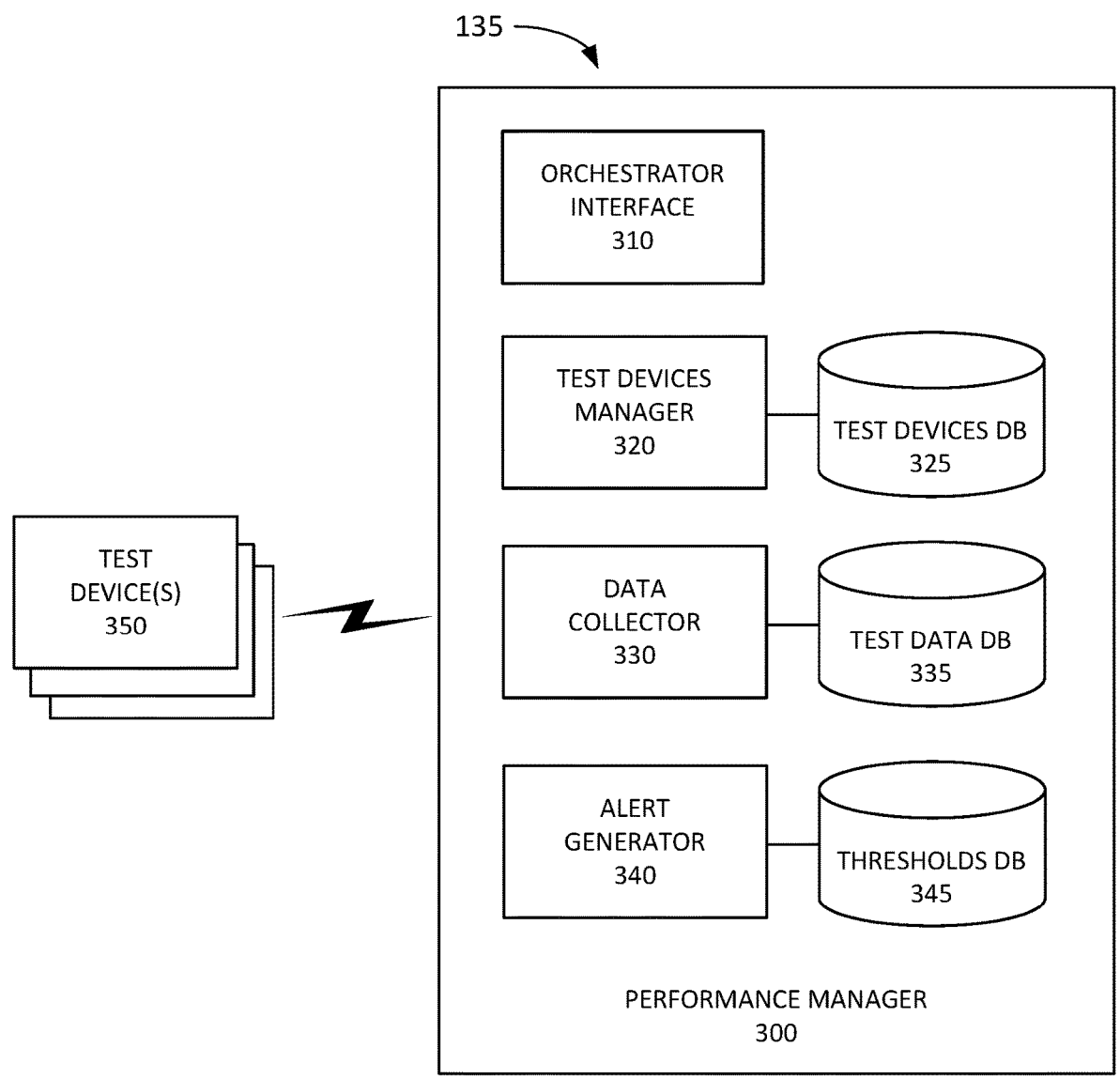
FIG. 3 illustrates exemplary components of the Multi-access Edge Computing (MEC) device of FIG. 1 according to an implementation described herein.

FIG. 3 is a diagram illustrating exemplary components of MEC device 135. The components of MEC device 135 may be implemented, for example, via processor 220 executing instructions from memory 230. Alternatively, some or all of the components of MEC device 135 may be implemented via hard-wired circuitry. As shown in FIG. 3, MEC device 135 may include an orchestrator interface 310, a test devices manager 320, a test devices database (DB) 325, a data collector 330, a test data DB 335, an alert generator 340, and a thresholds DB 345. Furthermore, MEC device 135 may be in communication with one or more test devices 350 via, for example, RAN 120.

Orchestrator interface 310 may be configured to communicate with orchestration system 145. For example, orchestration interface 310 may receive instructions from orchestration system 145 and may provide information, such as test results or alerts, to orchestration system 145. Test devices manager 320 may manage test devices 350. Test device 350 may include UE device 110. As an example, with a user's permission, a performance testing application may be installed on UE device 110 and UE device 110 may be recruited, during a time period when the user is not using UE device 110, send test packets to MEC device 135 using a particular protocol. As another example, a provider managing MEC network 130 may send a technician into the field to particular locations with UE device 110 configured as test device 350. As yet another example, UE device 110 configured as test device 350 may be installed on an autonomous vehicle or unmanned aerial drone and instructed to send test packets to MEC device 135 from particular locations. Additionally, or alternatively, test device 350 may be included in base station 125 or in core network 140 and may send test packets to MEC device 135 via a wired connection or a short-range wireless connection (e.g., WiFi, Bluetooth, etc.).

Test devices DB 325 may store information relating to test devices 350. For example, test devices DB 325 may store information identifying each test device 350, how to reach each test device 350, a location of each test device 350, and/or other types of information that may be needed to instruct test device 350 to send test packets to MEC device 135 using a particular protocol.

Data collector 330 may collect test data received from test devices 350 by MEC device 135 and store the collected test data in test data DB 335. Data collector 330 may send the data stored in test data DB 335 to orchestrator system 145 via orchestrator interface 310. Alert generator 340 may generate an alert, and send the alert to orchestrator system 145, when a parameter, or a capacity, associated with MEC device 135 reaches or exceeds a threshold stored in thresholds DB 345. As an example, alert generator 340 may generate an alert when MEC device 135 detects that packets associated with a particular protocol reach or exceed a latency requirement, a throughput requirement, a signal quality requirement, and/or another type of requirement. As another example, alert generator 340 may generate an alert when MEC device 135 detects that that a bandwidth capacity threshold has been reached, a storage capacity threshold has been reached, a processor load capacity has been reached, and/or another type of capacity threshold has been reached.

Although FIG. 3 shows exemplary components of MEC device 135, in other implementations, MEC device 135 may include fewer components, different components, differently arranged components, or additional components than depicted in FIG. 3. Additionally, or alternatively, one or more components of MEC device 135 may perform functions described as being performed by one or more other components of MEC device 135.

Figure 4:
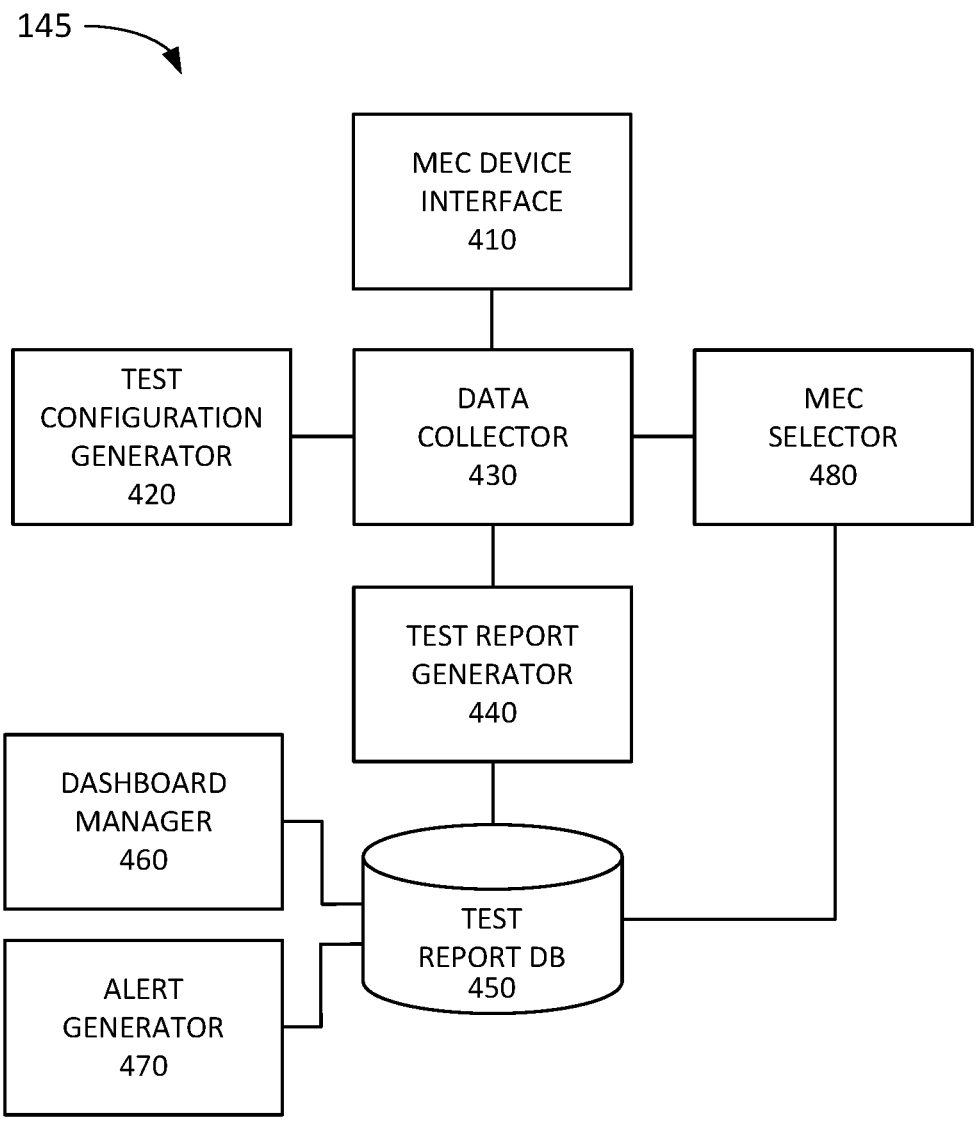
FIG. 4 illustrates exemplary components of the orchestrator system of FIG. 1 according to an implementation described herein.

FIG. 4 is a diagram illustrating exemplary components of orchestration system 145. The components of orchestration system 145 may be implemented, for example, via processor 220 executing instructions from memory 230. Alternatively, some or all of the components of orchestration system 145 may be implemented via hard-wired circuitry. As shown in FIG. 4, orchestration system 145 may include a MEC device interface 410, a test configuration generator 420, a data collector 430, a test report generator 440, a test report DB 450, a dashboard manager 460, an alert generator 470, and a MEC selector 480.

MEC device interface 410 may be configured to communicate with MEC device 135. For example, MEC device interface 410 may send instructions to MEC device 135 and/or may receive test data or alerts from MEC device 135. Test configuration generator 420 may generate a test configuration for a test to be performed by MEC device 135 using test devices 350. For example, an administrator may select a particular parameter to test using a particular protocol. Furthermore, the administrator may select a set of locations within the service range of base station 125 associated with MEC device 135 from which the test is to be performed.

Data collector 430 may collect test data from MEC devices 135 and provide the collected test data to test report generator 440. Test report generator 440 may generate a test report based on the collected test data and store the generated test report in test report DB 450. Exemplary information that may be stored in test report DB 450 is described below with reference to FIG. 5.

Dashboard manager 460 may manage a dashboard that enables an administrator to view or analyze the generated test report. For example, dashboard manager 460 may generate a visual representation of the generated test report. The visual representation may be customizable. Alert generator 470 may generate an alert when a particular parameter associated with a particular MEC device 135 is reached or exceeded. Alert generator 470 may generate an alert, and send the alert to dashboard manager 460 to display the alert, when a parameter, or a capacity, associated with a MEC device 135 reaches or exceeds a threshold and/or when an alert is received from MEC device 135.

MEC selector 480 may select a particular MEC device 135 for a session requested by a particular UE device 110. For example, a session request, from UE device 110 requesting a MEC service) may be associated with a particular latency requirement, a particular throughput requirement, a particular capability requirement (e.g., an AI accelerator, a GPU capable of a particular number of parallel processes, a particular application, etc.), and/or another type of service requirement. MEC selector 480 may access test report DB 450 and select a MEC device 135 that is the closest to the UE device 110 and satisfies the MEC request requirements.

Although FIG. 4 shows exemplary components of orchestration system 145, in other implementations, orchestration system 145 may include fewer components, different components, differently arranged components, or additional components than depicted in FIG. 4. Additionally, or alternatively, one or more components of orchestration system 145 may perform functions described as being performed by one or more other components of orchestration system 145.

Figure 5:
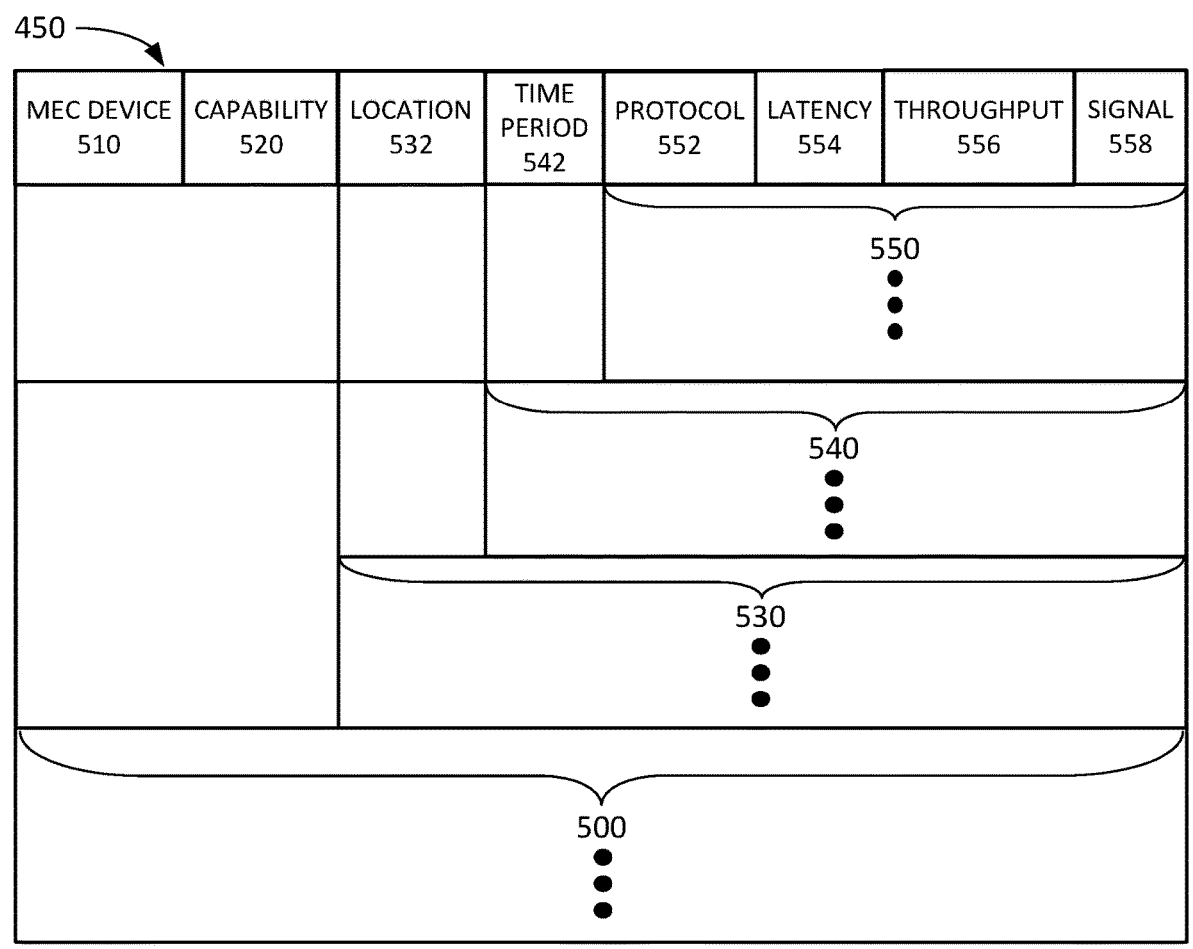
FIG. 5 illustrates exemplary components of the test report database of FIG. 4 according to an implementation described herein.

FIG. 5 is a diagram illustrating exemplary information stored in test report DB 450 according to an implementation described herein. As shown in FIG. 5, test report DB 450 may include one or more MEC device records 500. Each MEC device record 500 may store information relating to a particular MEC device 135. MEC records 500 may be updated by orchestration system 145 at particular intervals. Each MEC device record 500 may include a MEC device field 510, a capability field 520, and one or more location records 530.

MEC device field 510 may store information identifying a particular MEC device 135. For example, MEC device field 510 may store a name of the particular MEC device 135, an IP address of the particular MEC device 135, a Media Access Control (MAC) address of the particular MEC device 135, and/or another type of identifier associated with the particular MEC device 135. Capability field 520 may store information relating to the capabilities of the particular MEC device 135, such as, for example, whether the particular MEC device 135 includes a particular type of CPU, GPU, TPU, hardware accelerator device, virtual device, operating system, application, and/or other types of capability information. Furthermore, the capability information may include capacity information for available network bandwidth, number of connections/sessions available for UE devices 110, processors, memory devices, virtual devices, applications, and/or other types of capacity information.

Each location record 530 may store information associated with a particular location. Location record 530 may include a location field 532 and one or more time period records 540. Location field 532 may identify a particular location in the service area of base station 125 associated with the particular MEC device 135. As an example, location field 532 may store Global Positioning System (GPS) coordinates for the particular location. As another example, location field 532 may identify a particular area in the service area of base station 125.

Each time period record 540 may store information associated with a particular time period. Time period record 540 may include a time period field 542 and one or more protocol records 550. Time period field 542 may identify the particular time period, such as, for example, a time of day, a day of week, a time of year, the most recent time interval during which test data was received (e.g., the last 24 hours, etc.), and/or another time period associated with test results stored in MEC device record 500.

Each protocol record 550 may store information relating to a particular protocol. Protocol record 550 may include a protocol field 552, a latency field 554, a throughput field 556, and a signal field 558. Protocol field 552 may identify a particular protocol, such as, for example, ICMP, TCP, UDP, RTTP, HTTP, TLS, MQTT, and/or another type of protocol. Latency field 554 may store one or more latency values measured for the particular protocol from test device 350 to MEC device 135. For example, latency field 554 may store an OWD value, an RTT value, a bandwidth-delay product value, a packet delay variation value, and/or another type of latency value. Throughput field 556 may store one or more throughput values measured for the particular protocol from test device 350 to MEC device 135. Signal field 558 may store one or more signal quality values measured for the particular protocol from test device 350 to MEC device 135, such as, for example, a wireless signal quality value, a jitter value, an error rate value, and/or another type of signal quality value.

Although FIG. 5 shows exemplary components of test report DB 450, in other implementations, test report DB 450 may include fewer components, different components, additional components, or differently arranged components than depicted in FIG. 5.

Figure 6:
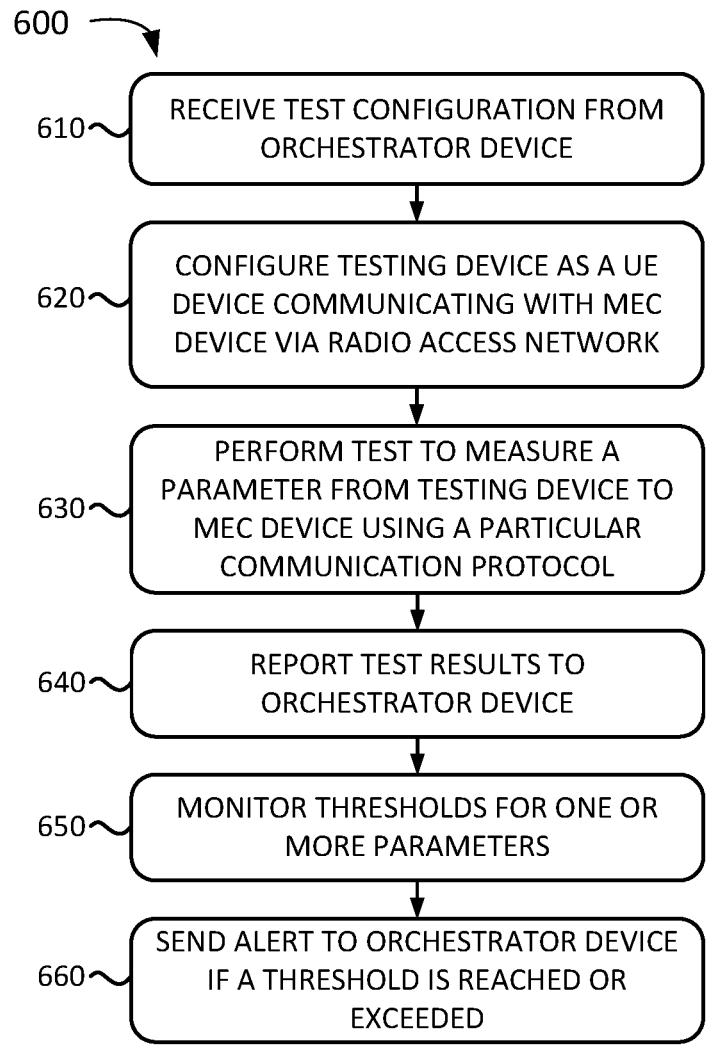
FIG. 6 illustrates a flowchart of a process for testing performance of a Multi-access Edge Computing (MEC) device according to an implementation described herein.

FIG. 6 illustrates a flowchart 600 of a process for testing performance of a Multi-access Edge Computing (MEC) device according to an implementation described herein. In some implementations, the process of FIG. 6 may be performed by MEC device 135. In other implementations, some or all of the process of FIG. 6 may be performed by another device or a group of devices separate from MEC device 135.

The process of FIG. 6 may include receiving a test configuration from an orchestrator device (block 610). For example, orchestrator interface 310 may receive instructions from orchestrator system 145 to carry out a performance test to test one or more parameters for a particular protocol from a particular location. A testing device may be configured as a UE device communicating with the MEC device via a RAN (block 620), a test may be performed to measure a parameter from the testing device to the MEC device using a particular protocol (block 630), and the test results may be reported to the orchestrator device (block 640). For example, MEC device 135 may instruct test device 350 to send test packets to MEC device 135 from the particular location using the particular protocol. MEC device 135 may determine one or more parameters for the received test packets, such as a latency value, a throughput value, a signal quality value, and/or another type of value. MEC device 135 may then provide the determined parameter values to orchestrator system 145.

Thresholds for one or more parameters may be monitored (block 650) and an alert to the orchestrator device may be sent if a threshold is reached or exceeded (block 660). For example, orchestrator interface 310 may receive instructions from orchestrator system 145 to implement an alert if a threshold for a performance parameter or a capacity is reached or exceeded. In response, alert generator 340 may be configured to implement the alert. For example, alert generator 340 may generate an alert when MEC device 135 detects that packets associated with a particular protocol reach or exceed a latency requirement, a throughput requirement, a signal quality requirement, and/or another type of requirement. As another example, alert generator 340 may generate an alert when MEC device 135 detects that that a bandwidth capacity threshold has been reached, a storage capacity threshold has been reached, a processor load capacity has been reached, and/or another type of capacity threshold has been reached.

Figure 7:
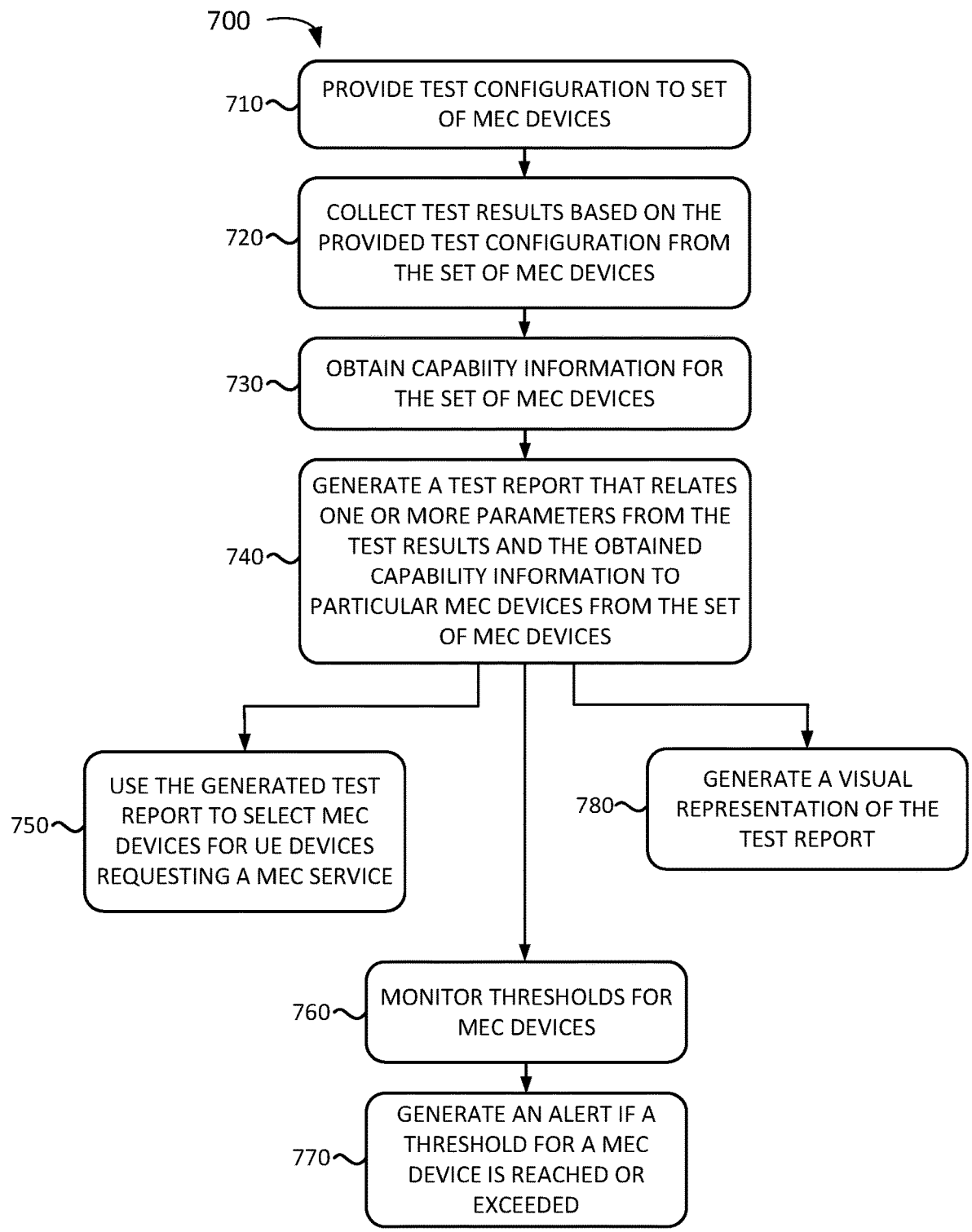
FIG. 7 illustrates a flowchart of a process for collecting test information relating to MEC devices according to an implementation described herein.

FIG. 7 illustrates a flowchart 700 of a process for collecting test information relating to MEC devices according to an implementation described herein. In some implementations, the process of FIG. 7 may be performed by orchestration system 145. In other implementations, some or all of the process of FIG. 7 may be performed by another device or a group of devices separate from orchestration system 145.

Some or all of the process of FIG. 7 may be repeatedly performed at particular intervals (e.g., every 24 hours, every 12 hours, every 6 hours, etc.). The process of FIG. 7 may include providing a test configuration to a set of MEC devices (block 710) and test results based on the provided test configuration may be collected from the set of MEC devices (block 720). Orchestration system 145 may send instructions to a set of MEC device 135 in a set of MEC network 130, such as, for example, based on a selected parameter and protocol to be tested from a set of locations within the service range of base stations 125 associated with particular MEC devices 135 in the set of MEC devices 135. Orchestrator system 145 may then collect test data from the set of MEC devices 135.

Capability information for the set of MEC devices may be obtained (block 730). For example, orchestration system 145 may query MEC devices 135 for capability and/or capacity information and provide the capability and/or capacity information to test report generator 440. A test report may be generated that relates one or more parameters from the test results and the obtained capability information to particular MEC devices from the set of MEC devices (block 740). For example, orchestrator system 145 may generate a test report based on the obtained test results and the obtained capability information.

The generated test report may be used to select MEC devices for UE devices requesting a MEC service (block 750). For example, orchestrator system 145 may receive a request from UE device 110, via base station 125, or via core network 140, for a MEC service. In response, orchestrator system 145 may determine the requirements associated with the requested MEC service, such as, for example, a latency requirement, a throughput requirement, a capability requirement, and/or another type of service requirement. Orchestrator system 145 may access test report DB 450 and select a MEC device 135 that is the closest to the UE device 110 and satisfies the MEC request requirements.

Thresholds for MEC devices may be monitored (block 760) and an alert may be generated if a threshold for a MEC device is reached or exceeded (block 770). For example, orchestrator system 145 may generate an alert when a particular parameter associated with a particular MEC device 135 is reached or exceeded, and/or when an alert is received from MEC device 135. A visual representation of the test report may be generated (block 780). For example, orchestrator system 145 may generate a visual representation of the generated test report to be viewed by an administrator.

Figure 8:
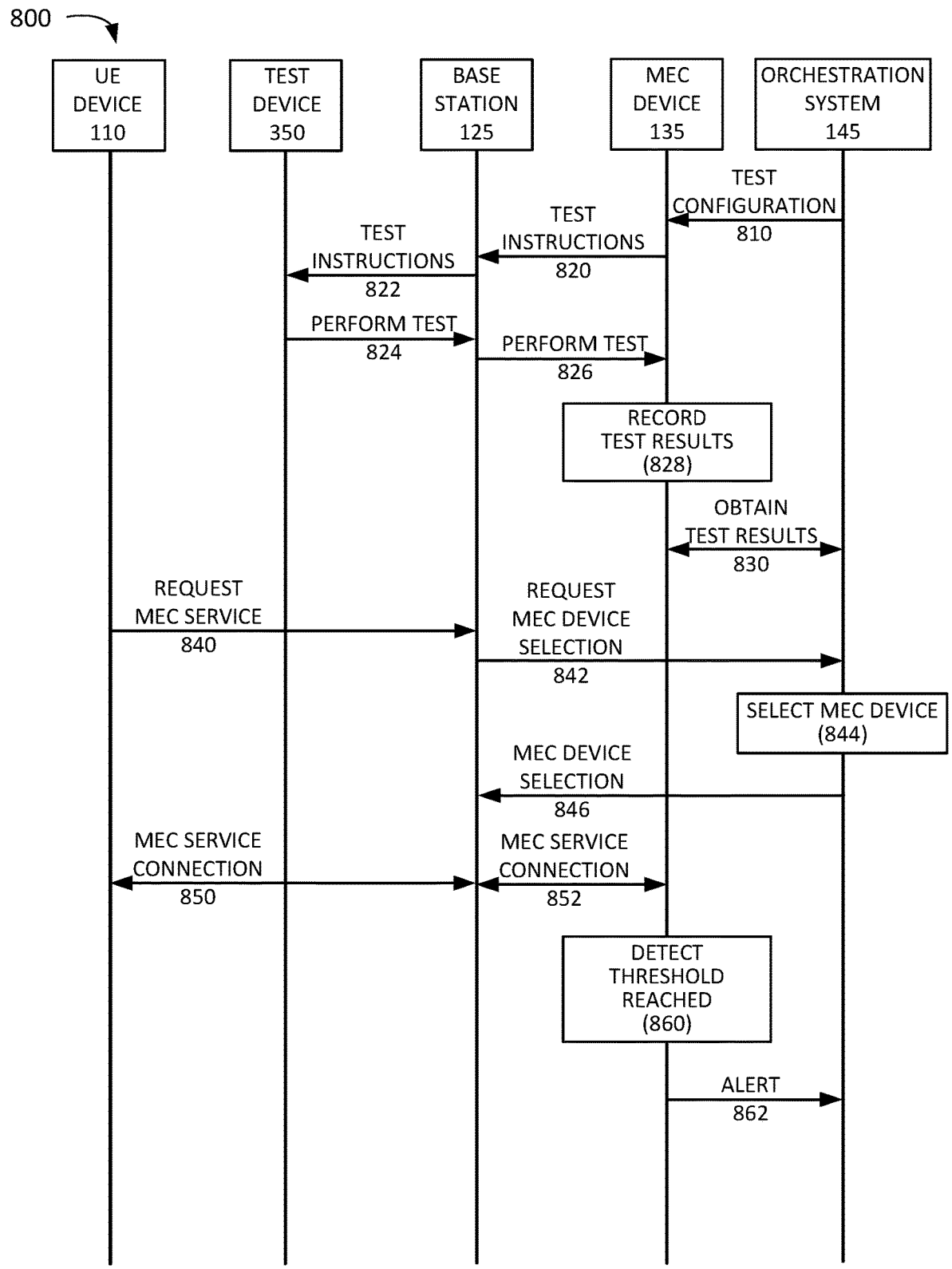
FIG. 8 illustrates an exemplary signal flow according to an implementation described herein.

FIG. 8 illustrates an exemplary signal flow 800 according to an implementation described herein. As shown in FIG. 8, signal flow 800 may include orchestration system 145 sending a test configuration to MEC device 135 (signal 810). MEC device 135 may send test instructions to test device 350 via base station 125 based on the received test configuration (signals 820 and 822). In response, test device 350 may perform the test by sending test packets to MEC device 135 via base station 125 (signals 824 and 826). MEC device 135 may record the test results (block 828). MEC device 135 may then provide the test results to orchestration system 145 when orchestration system 145 requests to obtain the test results (signal 830). Orchestration system 145 may then incorporate the test results into a test report.

At a later time, UE device 110 may request a MEC service via base station 125 (signals 840 and 842). For example, UE device 110 may request video content that is stored by MEC device 135, to play a game hosted by MEC device 135, to use machine language computing performed by an AI accelerator included in MEC device 135, to access a DNS server hosted by MEC device 135, to use a VNF hosted by MEC device 135, to communicate with an IoT server hosted by MEC device 135, and/or to request another type of MEC service.

In response, orchestration system 145 may determine the requirements associated with the requested MEC service and may select a particular MEC device 135 that is in proximity to UE device 110 and that satisfies the determined requirements based on information stored in the test report (block 844). Orchestration system 145 may send the MEC device selection to base station 125 (signal 846) and base station 125 may enable a connection for the MEC service between UE device 110 and MEC device 135 (signals 850 and 852).

At a later time, MEC device 135 may detect that a threshold has been reached for a parameter or a capacity (block 860). For example, MEC device 135 may detect that a latency threshold has been reached, that a data throughput has been reached, that a bandwidth capacity threshold has been reached, that an available capacity for a hardware device has been reached, etc. In response, MEC device 135 may send an alert to orchestrator system 145 (signal 862). Orchestrator system 145 may update a test report and/or alert an administrator based on the received alert.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIGS. 6 and 7, and a series of signals with respect to FIG. 8, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   providing, by a computer device, a test configuration to a plurality of multi-access edge computing (MEC) devices, wherein the test configuration instructs a MEC device, of the plurality of MEC devices, to measure latency from a particular location to the MEC device for a particular communication protocol by sending test packets from a user equipment (UE) device to the MEC device;
   collecting, by the computer device, test results associated with the provided test configuration from the plurality of MEC devices;
   obtaining, by the computer device, capability information associated with particular ones of the plurality of MEC devices, wherein the capability information specifies whether the particular ones of the plurality of MEC devices include a particular type of hardware or software component;
   generating, by the computer device, a test report that relates one or more parameters included in the test results and the obtained capability information to particular ones of the plurality of MEC devices, wherein the test report relates particular locations and communication protocols to latency values;
   receiving, by the computer device, a request for a MEC service from a user equipment (UE) device, wherein the MEC request is associated with at least one requirement; and
   using, by the computer device, the generated test report to select a MEC device from the plurality of MEC devices for the requested MEC service based on the at least one requirement.

2. The method of claim 1, further comprising:
   detecting that a threshold for a particular one of the one or more parameters has been reached for a particular one of the plurality of MEC devices; and
   generating an alert, in response to detecting that the threshold for the particular one of the one or more parameters has been reached for the particular one of the plurality of MEC devices.

3. The method of claim 1, further comprising:
   generating a visual representation of the test report; and
   providing the generated visual representation of the test report to an administration device.

4. The method of claim 1, wherein the capability information includes information indicating whether a particular one of the MEC devices includes at least one of a particular type of processing unit, a particular type of hardware accelerator device, a particular type of application, or information indicating a capacity associated with a particular hardware element or application.

5. The method of claim 1, wherein the particular communication protocol includes at least one of:
   Internet Control Message Protocol (ICMP), Transmission Control Protocol (TCP),
User Datagram Protocol (UDP),
Real-Time Transport Protocol (RTTP),
Hypertext Transfer Protocol (HTTP),
Transport Layer Security (TLS), or
Message Queue Telemetry Transport (MQTT).

6. The method of claim 1, wherein the test report further relates the particular locations and communication protocols to at least one of available bandwidth, throughput, bandwidth delay product, packet delay variation, error rate, or signal quality.

7. The method of claim 1, wherein the selected MEC device, from the plurality of MEC devices, is to communicate with the UE device via a Fifth Generation (5G) New Radio (NR) radio access network.

8. A computer device comprising:
a memory storing instructions; and
a processor configured to execute the instructions to:
provide a test configuration to a plurality of multi-access edge computing (MEC) devices, wherein the test configuration instructs a MEC device, of the plurality of MEC devices, to measure latency from a particular location to the MEC device for a particular communication protocol by sending test packets from a user equipment (UE) device to the MEC device;
collect test results associated with the provided test configuration from the plurality of MEC devices;
obtain capability information associated with particular ones of the plurality of MEC devices, wherein the capability information specifies whether the particular ones of the plurality of MEC devices include a particular type of hardware or software component;
generate a test report that relates one or more parameters included in the test results and the obtained capability information to particular ones of the plurality of MEC devices, wherein the test report relates particular locations and communication protocols to latency values;
receive a request for a MEC service from a user equipment (UE) device, wherein the MEC request is associated with at least one requirement; and
use the generated test report to select a MEC device from the plurality of MEC devices for the requested MEC service based on the at least one requirement.

9. The computer device of claim 8, wherein the processor is further configured to:
detect that a threshold for a particular one of the one or more parameters has been reached for a particular one of the plurality of MEC devices; and
generate an alert, in response to detecting that the threshold for the particular one of the one or more parameters has been reached for the particular one of the plurality of MEC devices.

10. The computer device of claim 8, wherein the processor is further configured to:
generate a visual representation of the test report; and
provide the generated visual representation of the test report to an administration device.

11. The computer device of claim 8, wherein the capability information includes information indicating whether a particular one of the MEC devices includes at least one of a particular type of processing unit, a particular type of hardware accelerator device, a particular type of application, or information indicating a capacity associated with a particular hardware element or application.

12. The computer device of claim 8, wherein the test report further relates the particular locations and communication protocols to at least one of available bandwidth, bandwidth delay product, packet delay variation, or signal quality.

13. A system comprising:
a multi-access edge computing (MEC) device configured to:
connect to a radio access network; and
perform one or more MEC services for user equipment (UE) devices connected to the radio access network; and
a MEC orchestrator device configured to:
provide a test configuration to a plurality of multi-access edge computing (MEC) devices, wherein the plurality of MEC devices includes the MEC device, wherein the test configuration instructs a MEC device, of the plurality of MEC devices, to measure latency from a particular location to the MEC device for a particular communication protocol by sending test packets from a user equipment (UE) device to the MEC device;
collect test results associated with the provided test configuration from the plurality of MEC devices;
obtain capability information associated with particular ones of the plurality of MEC devices, wherein the capability information specifies whether the particular ones of the plurality of MEC devices include a particular type of hardware or software component;
generate a test report that relates one or more parameters included in the test results and the obtained capability information to particular ones of the plurality of MEC devices, wherein the test report relates particular locations and communication protocols to latency values;
receive a request for a MEC service from a UE device, wherein the MEC request is associated with at least one requirement; and
use the generated test report to select the MEC device from the plurality of MEC devices for the requested MEC service based on the at least one requirement.

14. The system of claim 13, wherein the MEC device is further configured to:
receive the test configuration from the MEC orchestration device;
perform a test based on the received test configuration; and
provide test results based on the performed test to the MEC orchestration device.

15. The system of claim 13, wherein the MEC device is further configured to:
configure a testing device as a UE device configured to communicate with the MEC device via the radio access network; and
perform the latency test to measure a latency from the testing device to the MEC device using the particular communication protocol.

16. The system of claim 13, wherein the MEC device is further configured to:
detect that a threshold for a parameter, of the one or more parameters, has been reached; and
send an alert to the MEC orchestrator device, in response to detecting that the threshold for the parameter has been reached.

17. The system of claim 13, wherein the particular communication protocol includes at least one of:
Internet Control Message Protocol (ICMP), Transmission Control Protocol (TCP),
User Datagram Protocol (UDP),
Real-Time Transport Protocol (RTTP),
Hypertext Transfer Protocol (HTTP),
Transport Layer Security (TLS), or
Message Queue Telemetry Transport (MQTT).

18. The system of claim 13, wherein the MEC orchestrator device is further configured to:
   generate a visual representation of the test report; and
   provide the generated visual representation of the test report to an administration device.

19. The system of claim 13, wherein the capability information includes information indicating whether a particular one of the MEC devices includes at least one of a particular type of processing unit, a particular type of hardware accelerator device, a particular type of application, or information indicating a capacity associated with a particular hardware element or application.

20. The system of claim 13, wherein the test report further relates the particular locations and communication protocols to at least one of available bandwidth, bandwidth delay product, packet delay variation, or signal quality.

\* \* \* \* \*